Aug. 26, 1941.  B. GROB ET AL  2,253,515
BAND SAW
Filed Jan. 10, 1938   3 Sheets-Sheet 2
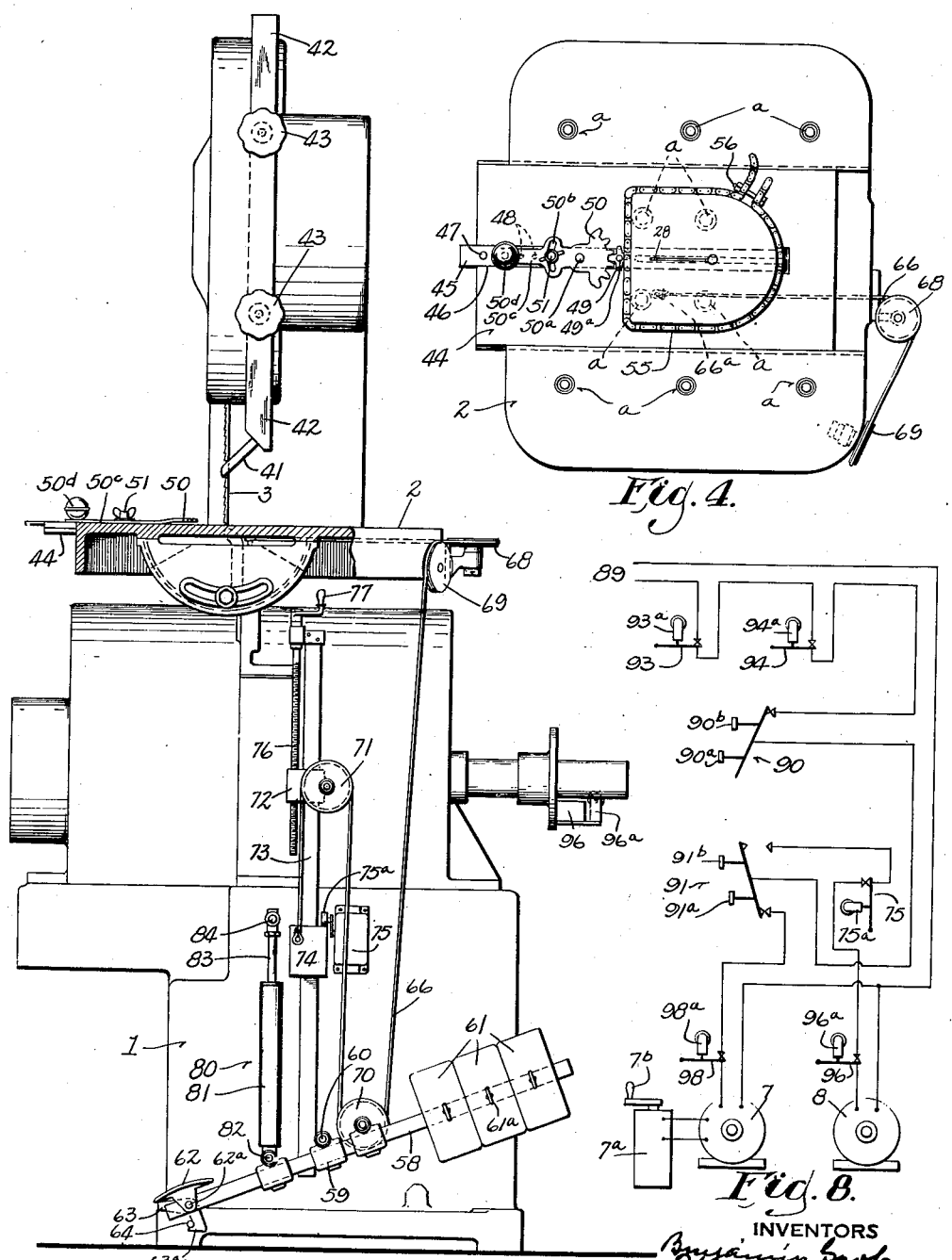

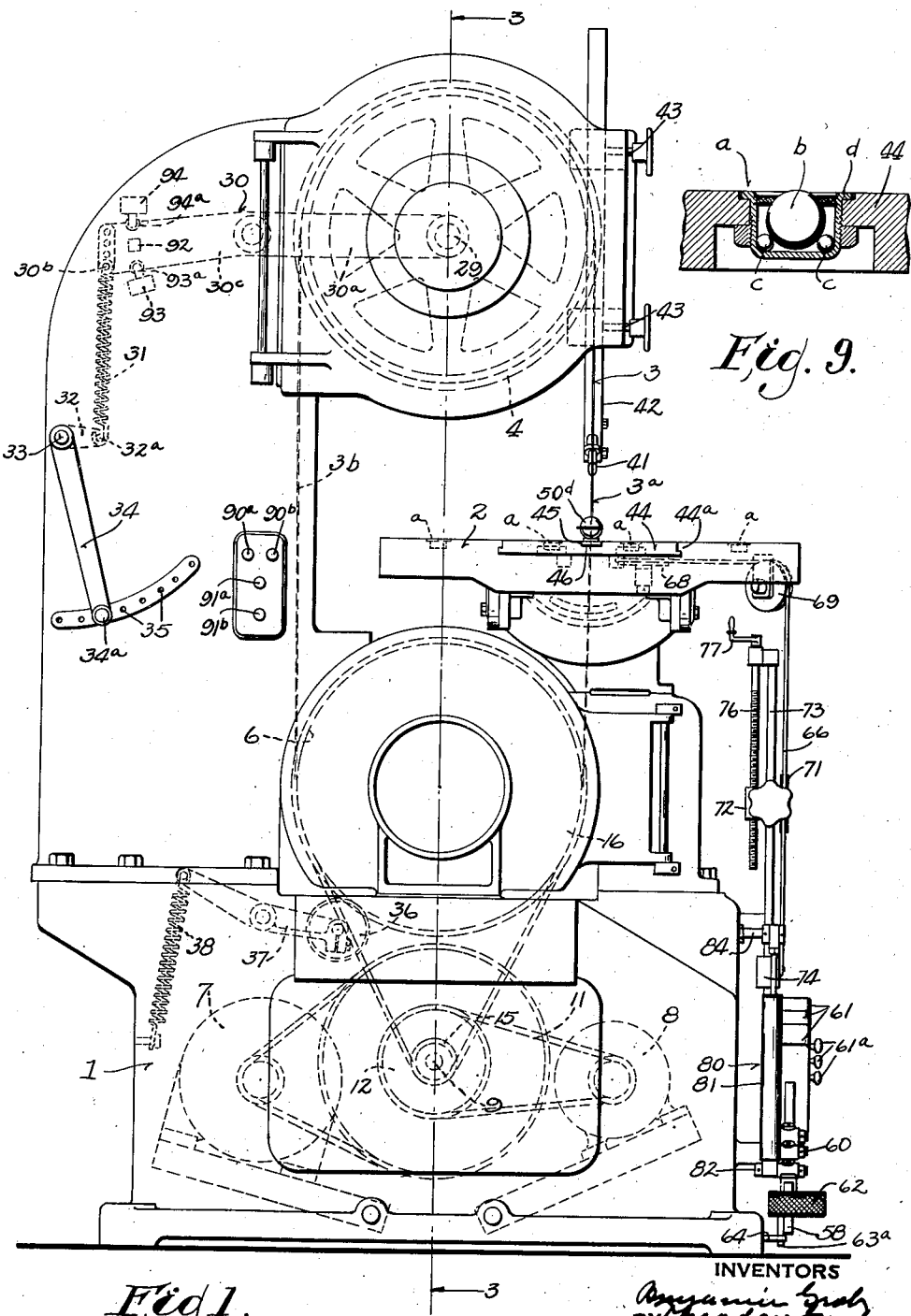

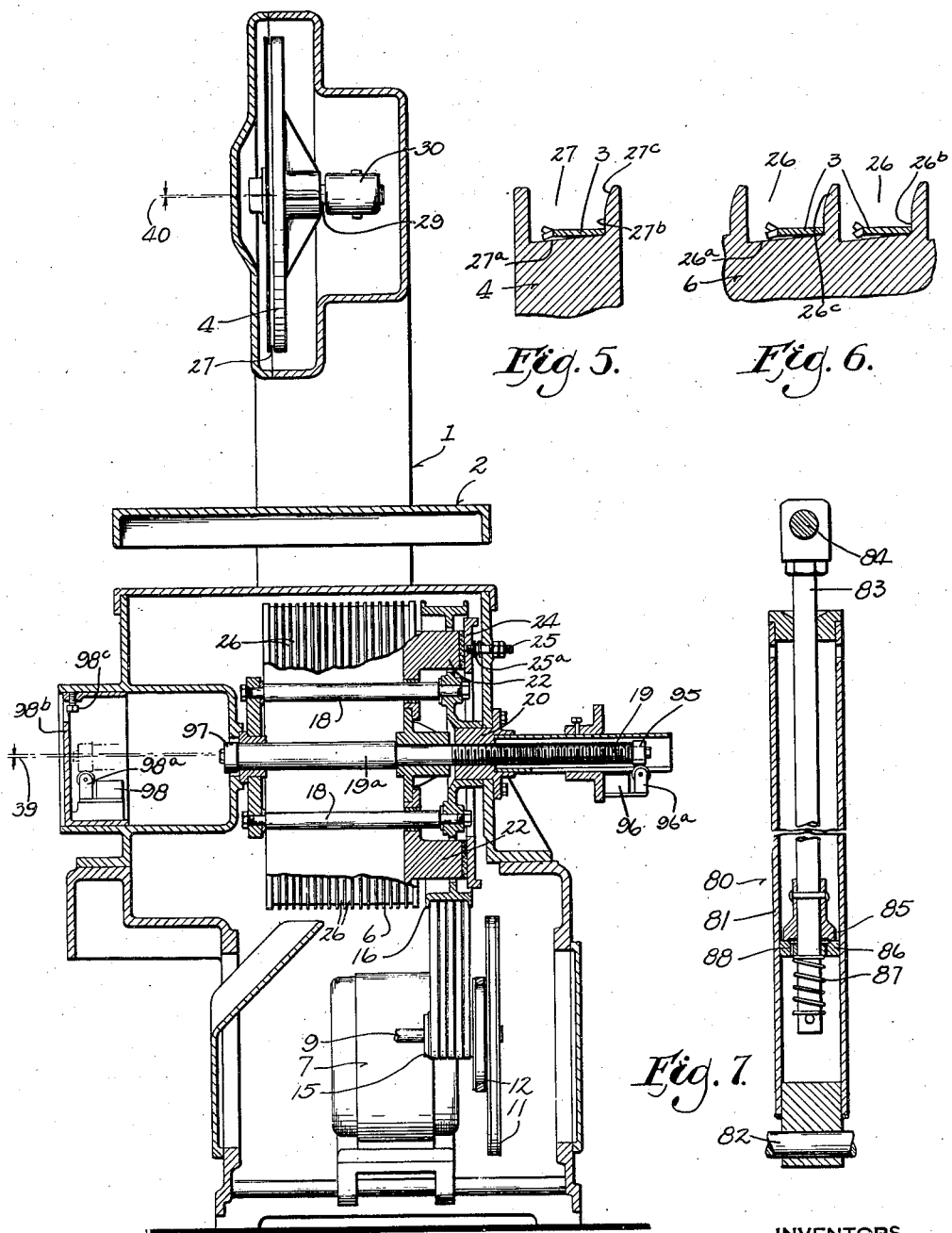

Patented Aug. 26, 1941

2,253,515

UNITED STATES PATENT OFFICE 2,253,515

BAND SAW

Benjamin Grob and Theodore Grob, Grafton, Wis.

Application January 10, 1938, Serial No. 184,164

10 Claims. (Cl. 29—68)

This invention relates to band sawing machines and particularly to machines adapted for the sawing of metal.

A purpose is to provide an improved machine of the open end band saw type disclosed in the Patents No. 2,050,490, issued August 11, 1936, and No. 2,090,195, issued August 17, 1937.

A further purpose is to provide an improved work positioning and guiding means, both for band saws and for other tools requiring similar work positioning and guiding operations.

A further purpose is to provide an improved work feeding mechanism for band saws generally, and particularly for band saws of the open end type.

A further purpose is generally to simplify and improve the construction and operation of band saw machines, and particularly of metal sawing machines of the open end band saw type and still other purposes will be apparent to those skilled in the art.

The invention consists of the structure herein illustrated, described and claimed and in such modifications thereof as are equivalent to the structure of the claims.

The same parts are designated by the same reference characters throughout, and in the drawings:

Figure 1 shows an elevation of a band saw machine incorporating the invention, viewed from the front or operator's side of the machine.

Figure 2 shows an elevation of the same machine viewed from the right of Fig. 1.

Figure 3 is a sectional elevation of the same machine along a line approximately corresponding to line 3—3, Fig. 1.

Figure 4 is a plan view of the work supporting table and some of the associated mechanism.

Figures 5 and 6 are enlarged fragmentary sections respectively showing the form of certain grooves in the periphery of the upper saw pulley and of the saw carrying drum or spool of the machine.

Figure 7 is a section through a piston device associated with certain feed mechanism.

Figure 8 is a diagram of some of the control mechanism of the machine.

Figure 9 is a vertical section through an antifriction work support device

The machine includes a main frame or support 1, a work table 2, a band saw 3, an upper pulley 4 on which travels a loop of the saw, and a drum or spool 6 which drives the saw, and upon which the saw is carried, except for the loop portion extending over pulley 4, as later explained. The drum 6 is alternatively driven in a forward sawing direction from a motor 7, or in a reverse direction at a relatively fast rate by a motor 8. Similarly to the machine of said Patent No. 2,090,195, a shaft 9 is carried by a pivoted bracket, not shown, and has fixed thereon a relatively large pulley 11 driven from motor 7 and small pulley 12 driven from motor 8. Also fixed on shaft 9 is a pulley 15 which drives a pulley 16, which in turn drives drum 6 through rods 18 fixed with the pulley 16.

The drum in addition to being rotatable is axially movable. To effect the axial movement the drum is fixed with an extended end 19a of a screw 19 which engages a nut 20 fixed with frame 1, and as the drum and screw rotate in a forward and reverse direction the nut 20 moves the drum axially in corresponding directions.

At the right hand end in Figure 3 the drum 6 is provided with axially extended portions 22 to provide brake surfaces engageable in the extreme right hand position of the drum with a nonrotatable brake member 24 adjustably carried by a plurality of studs as 25, the member 24 being yieldably urged to the left by springs 25a.

The drum 6 is provided with a helical saw retaining groove 26, Figs. 3, 6, the lead of the helix corresponding to the lead of the screw 20 and being sufficient for the saw 3 to be coiled in adjacent grooves of the helix, as in Fig. 6. One of the loops of the saw is extended over the pulley 4 to engage a groove 27, Figs. 3, 5, the remainder being wound tightly in the drum groove 26, and having its ends removably fixed with the drum by suitable clamps, not shown, one strand or flight 3a of the extended saw loop passing through an opening such as 28, Fig. 4, in the table 2, and the other strand 3b being housed within the frame 1 Pulley 4 is rotatable on suitable bearings, Fig. 3, carried on a stud 29 fixed in a lever arm 30a of a pivoted lever 30, Figs. 1, 3. The axis of pulley 4 is substantially, but not exactly in the same vertical plane as the axis of drum 6, there being a slight angular displacement, not shown, of the one axis relative to the other in the horizontal plane to compensate for the pitch or lead of the helical saw groove in the drum. As the drum is rotated and moved axially, as above described, the combined movement maintains the extended loop portion in the same axial position relative to pulley 4 throughout the axial movement of the drum whereby, during the sawing direction of drum rotation, substantially the full length of the saw will move through the working zone immediately above table 2.

To maintain a suitable tension on the extended saw loop during the sawing operation the pulley 4 is continuously urged upwardly by a spring 31, Fig. 1, which is hooked at one end over a pin 30b carried on an arm 30c of lever 30, and at the other end over a pin 32a carried on a lever 32 fixed on a shaft 33 upon which is also fixed a lever 34 which is manually adjustable to vary the tension of the saw Lever 34 carries a spring plunger 34a which is engageable with different spaced plunger recesses 35 for holding the lever in different tension positions. When the saw is to be loaded on or removed from the drum 6 and pulley 4 the lever 34 is shifted to lower the pulley 4.

It will be noted that one of the points of difference between the present machine and the machines of said patents is that drum 6 is provided with the grooves 26, the metal between the grooves providing substantially annular flanges against which the rear edge of the saw may be located, as shown in Fig. 6, whereby to closely determine the position of the vertical strand 3a where it passes through the working zone. In addition the drum grooves are of substantially the same mean diameter throughout the axial length of the drum whereby the working strand 3a of the saw band may be directly received on the drum while still maintaining the strand in substantially the same vertical plane in any axial position of the drum, while avoiding the use of additional guide pulleys such as are required for the tapered drums of previous machines, in any axial position of the drum. Moreover the constant diameter drum makes it unnecessary for the saw tensioning device to operate through a range sufficient to provide for a difference in the length of the extended saw loop otherwise caused by the difference in drum diameter at different points along its axis. The result is a more uniform tension on the saw band. With the present construction there need be, ordinarily, only one saw pulley besides the drum, provided the pulley and drum are made of sufficient diameter, as here shown, to provide the desired throat distance between the front strand 3a and the rear strand 3b of the extended saw loop, and the operation of the machine is greatly improved.

When the tension of the saw band is removed as previously described, or as would occur if the saw should break, thereby removing the tension in the extended loop, it is undesirable that the saw portions which are wrapped on drum 6 should be permitted to unwind. To prevent such unwinding a roller or pulley 36, Fig. 1, is carried on a pivoted lever 37 and continuously pressed by a spring 38 against some of the loops of the saw on either side of the extended loop which passes over pulley 4.

The grooves 26, 27 respectively in drum 6 and pulley 4 are of slanted or angular bottom form, as shown at 26a, Fig. 6, and at 27a, Fig. 5. This permits the saw to coil in substantially cylindrical form in spite of the offset of the teeth and the angle causes the saw to be urged axially to locate the saw with its rear edge against one side of the saw groove, as in Fig. 6. The grooves are preferably of sufficient bottom angle that the offset teeth do not engage the bottom of the groove, or engage with very little pressure. To further assist in urging the rear side of the saw band to ride against the side of the grooves opposite the saw teeth the axes of the drum 6 and of pulley 4 are mutually divergent to the left in Fig. 3, the axis of drum 6 being downwardly tilted at the left, Fig. 3, as at 39, while the axis of pulley 4 is similarly upwardly tilted at the left, Fig. 3, as at 40. Such tilting, though slight, might be sufficient, unless prevented, to cause the saw band to wrap onto the outer periphery of the flanges which define the grooves rather than to enter the grooves, and to prevent such result and to guide the saw to its desired position as it is wrapped about the pulley and drum the inner side face of the flanges, adjacent the rear edge of the saw band, are slanted and rounded as at 26c, Fig. 6, and 27c, Fig. 5.

To further guide and support the saw band at a point immediately adjacent the work there is provided a slotted rear guide member 41, Figs. 1, 2, fixed on a vertically adjustable support 42, which is suitably guided on frame 1, and which may be clamped in adjusted position by screws 43, 43.

For angular sawing the table 2 is guided for movement about either of mutually transverse pivots and may be clamped in adjusted position about either pivot, but since such structure may be of any suitable form such, for example, as that described for the machine of said Patent No. 2,090,195, it will not be here described.

Work holding and guiding means is provided for a work piece on table 2, as follows: A work supporting slide 44, Figs. 1, 2, 4 is closely but slidably fitted in any suitable form of guides such as the mutually engaged surfaces 44a, Fig. 1, for reciprocatory movement to right or left in Fig. 2. Another slide or member 45 is adjustable in a slot 46 along a path parallel to the movement of slide 44, the position of adjustment being determined by the engagement of an abutment member such as a pin 47, fixed in the member 45, with one or another of recesses such as 48, in the slide 44. An abutment member consisting of a toothed sprocket 49 is carried on the member 45, being movable about a pivot pin 49a which is fixed in the member 45. Sprocket 49 is meshed with a sprocket segment 50 which may be rotated on a pivot pin 50a, fixed in member 45, and clamped in various positions of its pivotal adjustment by the means of a screw 51 threaded in the member 45, there being an arcuate screw slot 50b to permit the pivotal movement. A hand lever portion 50c carries a hand grip member 50d by the means of which the segment 50 may be rotated, whereby to rotate the meshed sprocket 49 when screw 51 is unclamped. Also by means of the hand grip 50d the member 45 and slide 44 may be unitarily manually traversed in either direction of movement of slide 44. The sprocket member 49 may be engaged in various relative positions with a work holder device, which in this instance consists of a sprocket chain 55.

The sprocket chain 55 may be closely wrapped around work pieces of various and irregular outlines, as for instance the outline defined by the interior surface of the chain shown in Fig. 4, and may be rigidly clamped on the work piece as, for example, by a bolt such as 56 passing through the chain ends. The chain may be engaged with a tooth of the sprocket 49 in various lateral positions of the work piece which is held by the chain. The construction is such that the saw band, where it passes through table 2, and the pivot 49a of the sprocket 49, which acts as an abutment for the sawing pressure, are in a common plane parallel to the path of movement of slide 44 whereby, in any position of rotation of sprocket 49, the pressure point of chain and sprocket engagement is also in said common plane. With such construction the work supported on table 2 may be traversed in sawing direction to the right in Fig. 2, unitarily with slide 44, without any tendency for the work piece to move sidewise or in any manner which would permit a straight cut in said plane being effected in the work piece, and particularly if the segment 50 is clamped in position by screw 51, whereby to prevent rotation of the sprocket 49. The adjustment of sprocket 49 about its pivot 49a permits fine side-wise adjustment of the work piece, and therefore the path of the saw cut therein. It is obvious that the chain portion engaging the segment need not, and ordinarily will not, stand at right angles to the path of work movement to effect these results, although, for convenience, it is shown at right angles in Fig. 4.

When the screw 51 is released, whereby to permit rotation of segment 50 and sprocket 49 the hand grip 50d may be manually manipulated to simultaneously laterally shift the work piece on slide 44 and unitarily move the slide and work piece forward in a cutting direction against the saw. Such simultaneous movement may be readily controlled to effect various curved paths of the saw in the work piece, and the control is rendered more convenient and certain by reason of the maintenance of the pressure abutment in the plane of the cutting pressure in any position of rotation of sprocket 49, as previously explained.

In effecting manually guided sawing such as just mentioned, and generally for convenience in positioning the work piece, it is preferable to minimize the friction between the work piece and its support, particularly for heavy work. For this purpose there are anti-friction work support devices associated with table 44, such, for example as are generally indicated by the character a in Fig. 9. The device of Fig. 9 includes a ball b rolling on relatively smaller balls such as c, the balls being carried in a housing d, fixed with table 44 in a position for the top of ball b to stand slightly above the top of the table. A number of the devices a may be spaced apart on the table top, as indicated in Fig. 4, or otherwise suitably positioned. The effect is to permit of substantially frictionless lateral movement of even relatively heavy work pieces, whereby, for example, the work piece may be easily manually shifted in following irregular or curved lines with the saw cut.

Power means are provided for sawing movements of support 44 and of a work piece carried thereon, as follows: A weight bar 58, Fig. 2, is fixed with a member 59 for pivotal movement about a pivot pin 60 fixed in frame 1. At the one end bar 58 carries weights such as 61, each adjustably fixed on the bar by clamp screws such as 61a. At the other end the bar 58 carries a pivoted foot treadle 62 which may be pushed down to raise the weights 61, and also may be turned about a pivot pin 62a either to permit a hook portion 63a of a lever 63, which is also pivoted on pin 62a, to engage over a pin 64 fixed in frame 1, whereby to prevent downward movement of weights 61, or to disengage the hook portion 63a from the pin 64, whereby to permit downward movement of the weights.

A flexible cable 66 is fixed at the one end 66a, Fig. 4, with the slide 44 and passes over pulleys 68, 69, rotatably supported on table 2, a pulley 70 rotatably carried on pivoted weight bar 58, and a pulley 71 rotatably carried on a member 72 which is guided for vertical adjustment on a bar 73 fixed on frame 1, the other end of cable 66 being fixed with a member 74 which is also vertically adjustable on bar 73, but is limited in its upward movement upon contacting a movable member 75a of a control switch 75, the purpose of which will be later explained. The pulley 71, and member 72 are adjustable by the means of a screw 76 threadedly engaging the member 72 and manually rotatable by a hand crank 77.

Assuming that the work piece on table 2 has been positioned by engagement of the work holder chain 55 against the abutment sprocket 49 in the manner previously explained, the power operated sawing movement may be effected as follows:

The foot treadle 62 is operated to raise the weights 61 and to engage hook member 63a over pin 64 to retain the weights in upper position. The abutment member 47 is then adjusted to engage the work piece and saw, this being done by lifting the member 45 and adjusting it forwardly in slot 46. The crank 77 is then turned to raise the pulley 71, whereby it occurs that the cable 66 raises member 74 to a position contacting and shifting the switch member 75a, and substantially simultaneously moves slide 44 and the work piece to the right in Fig. 2, until the work piece contacts the saw. At this point the foot treadle 62 is turned to disengage the hook member 63a from pin 64 and the weights 61 then act to continue the movement of slide 44 to the right in Fig. 2, that is to say in the sawing direction.

If the length of the desired saw cut is greater than can be effected in one downward movement of the weights 61, the described operation may be repeated as many times as is necessary to complete the saw cut, the work piece being, when necessary, set forward relative to the table by disengaging the pin 47 from the engaged recess 48 of slide 44 and setting it forward into another recess 48, thereby adjusting the slide 45 and its work engaging abutment forwardly.

If the saw cut is of less length than would be effected in a full downward movement of the weights 61, the cut may be interrupted at any point by operating the foot treadle 62 to raise the weights and retain them in upper position.

In the sawing operations described the pressure of the work piece against the saw, and therefore the rate of sawing, may be regulated by the adjustment of the weights 61 along the bar 58 but in any given position of the weights the rate of sawing is determined by the resistance offered to the saw cut by the work.

It may occur that the sawing operation requires the saw cut to be continued into an aperture in the work piece. In such case the resistance to the movement of the work and of slide 44 would be suddenly removed and, unless prevented, the weights 61 would act to cause the slide and work to move rapidly to the right in Fig. 2, which might break or damage the saw band when the movement was arrested as the saw contacted the other side of the aperture in the work piece. To prevent such results the feed mechanism is provided with means preventing and cushioning unduly rapid movement, as follows:

A piston device, denoted in entirety by the numeral 80, Figs. 2, 7 includes a cylinder 81 connected by a pivot pin 82 for reciprocatory movement from the weight bar 58. A piston rod 83 is carried at the one end on a pivot pin 84 which is fixed in frame 1, and at the other end carries a piston abutment member 85 fixed thereon and a slidably mounted piston 86 which is normally urged against abutment 85 by a spring 87. The cylinder 81 is substantially filled with fluid, preferably oil, in which piston 86 may move, the piston being sufficiently smaller than the cylinder bore to by-pass the fluid with relatively slight resistance during upward movement of the cylinder in a feeding movement at any normal rate, but sufficiently restricting the fluid to prevent the fast movement which might otherwise occur when the saw runs into an aperture, as previously mentioned. The downward movement of cylinder 81, during the foot operated lifting of the weights 61, previously mentioned, may be effected at fast rate substantially without restriction, the piston then moving away from abutment 85, whereby the fluid is by-passed through openings such as 88.

Control mechanism is provided for the transmission of the machine, as follows: Current for both the cutting or forward direction motor 7, Fig. 8, and for the reverse motor 8 is supplied from a line 89, through a push-button switch 90 having a stop button 90a and a run button 90b, and through a push-button switch 91 having a button 91a for closing the circuit of the reversing motor 8 and a button 91b for alternatively closing the circuit of the forward or cutting motor 7. The cutting motor is provided with a speed controller 7a of the conventional type, whereby the cutting speed of the saw may be adjusted by manually shifting a lever 7b.

The control mechanism also includes automatic means stopping both motors 7, 8, in the event that the saw band should break, and preventing running of either motor during loading of the saw on spool 6 and pulley 4. In the event that the band breaks during operation of the machine the spring 31, Fig. 1, will pull lever arm 30c downwardly and a member 92 fixed on the lever arm will shift a movable member 93a of a pressure switch 93, Figs. 1, 8, to open the switch and interrupt the current from line 89. In the event that lever 34, Fig. 1, is shifted to relieve the tension in the saw band, during removal or replacement of the band the weight of pulley 4 will move the lever arm 93c upwardly and the member 92 will shift a movable member 94a of a switch 94 Figs. 1, 8, to open the switch and interrupt the current from line 89.

The control mechanism likewise includes automatic means for interrupting rotation and axial movement of drum 6 at the extreme of its right and left hand movement in Fig. 3. At nearly the end of the reverse or right hand movement, Fig. 3, a roller 95 in the end of screw 19 shifts a movable member 96a of a switch 96, Figs. 3, 8, thereby opening the branch line leading the reverse motor 8. This occurs at or about the time the brake members 22 contact brake member 24 and the drum is quickly brought to a stop, but may be started again in a forward direction by operation of push-button switch 91. At the end of the forward or left hand movement, Fig. 3, of drum 6 a roller 97 at the other end of screw 19 shifts a movable member 98a of a switch 98 thereby opening the branch line leading to the forward motor 7. Since the forward movement is relatively slow the drum stops immediately, without necessity for brake means, but may be started again in a reverse direction by operation of switch 91. Switch 98 is bodily adjustable for the purpose of interruption of the cutting direction of movement of drum 6 at any desired point in the axial movement of the drum, the switch being carried on a member 98b, Fig. 3, which may be releasably clamped in various axial positions, as by a screw 98c.

The control mechanism also includes automatic means preventing operation of the reverse motor at any time when the power feed mechanism, previously described, is operating to effect a cutting pressure between the saw and the work piece. This is the purpose of the previously mentioned switch 75, Figs. 2, 8. Switch 75 is normally closed but at any time when there is tension in the cable 66, such as must occur whenever the feed mechanism is effecting pressure of the work piece on the saw, the member 74 will shift the movable switch member 75a, thereby opening the branch line leading to the reverse motor.

What is claimed is:

1. A band saw machine including a laterally flexible saw band having teeth at one edge thereof shaped to project slightly sidewise of the band, and spaced rotatable saw carriers, one of said carriers having a thread-like peripheral groove of substantially constant mean diameter extended axially thereof, a major portion of said band being wound in said groove and a loop portion of said band being extended over the other carrier, the bottom of said groove being angularly disposed to the axis of said carrier in a manner to accommodate the teeth of said band, and transmission mechanism for simultaneous rotation and axial movement of said grooved carrier in alternative sawing or reverse directions.

2. A band saw machine including a laterally flexible saw band and spaced rotatable saw carriers, one of said carriers being extended axially, a major portion of said saw band being helically wound on said axially extended carrier and a loop portion of said band between adjacent helix coils being extended over the other carrier, said extended carrier being of a peripheral form to receive the saw band in loops of substantially equal mean diameter along the axis of the helix, and transmission mechanism for simultaneous rotation and axial movement of said grooved carrier in alternative sawing or reverse directions.

3. A band saw machine including a laterally flexible saw band and spaced rotatable saw carriers, one of said carriers providing a helical groove extended axially thereof and of substantially constant mean diameter, a major portion of said saw band being helically disposed in said helical groove and a loop portion of said band between adjacent helix portions being extended over the other carrier, and transmission mechanism for simultaneous rotation and axial movement of said grooved carrier in alternative sawing or reverse directions.

4. A band saw machine including a laterally flexible saw band and spaced rotatable saw carriers having axes substantially in a common plane, said axes being angularly disposed relative to one another in said plane, one of said carriers providing a peripheral axially extended helical groove of substantially constant mean diameter, a major portion of said band being wound in said groove and a loop portion of said band between adjacent helix windings thereof being extended over the other carrier, the bottom of said groove being angularly disposed to the axis of the grooved carrier, and transmission mechanism for simultaneous rotation and axial movement of said grooved carrier in alternative sawing or reverse directions.

5. A band saw machine including a laterally flexible saw band having teeth upon one edge thereof and spaced rotatable saw carriers, one of said carriers having a peripheral axially extended helical groove, a major portion of said band being wound in said groove, and a loop portion of said band between adjacent helix windings thereof being extended over the other carrier, and transmission mechanism for simultaneous rotation and axial movement of said grooved carrier in alternative sawing or reverse directions, the axes of said carriers being relatively slightly divergent in the direction toward which the toothed edge of said saw band projects to induce entry of said saw band into said groove with the untoothed edge thereof crowded toward the adjacent side of said groove.

6. A band saw machine including spaced rotatable saw carriers having band receiving grooves, a laterally flexible saw band having a toothed edge and mounted for travel around said carriers and through a working zone therebetween, the axes of said carriers being relatively slightly divergent in the direction toward which the toothed edge of said saw band projects to induce entry of said band into said groove with the untoothed edge thereof crowded toward the adjacent side of said groove.

7. A band saw machine including spaced rotatable saw carriers having band receiving grooves, a laterally flexible saw band having a toothed edge and mounted for travel around said carriers and through a working zone therebetween, and means causing said band to enter said groove in a line slightly divergent from the plane normal to the axis of said carrier to thereby induce crowding of the untoothed edge of said saw band toward the adjacent side of said groove.

8. A band saw including a laterally flexible saw band and spaced rotatable saw carriers, one of said carriers having a peripheral axially extended helical groove, a major portion of said band being wound in said groove, and a loop portion of said band between adjacent helix windings thereof being extended over the other carrier, transmission mechanism for simultaneous rotation and axial movement of said grooved carrier in alternative sawing or reverse directions, and means causing said band to enter said groove in a line slightly divergent from the plane normal to the axis of said carrier, to thereby induce crowding of the untoothed edge of said saw band toward the adjacent side of said groove.

9. A band saw machine including a laterally flexible saw band having teeth upon one edge thereof, and spaced rotatable saw carriers, one of said carriers having a peripheral axially extended helical groove, a major portion of said band being wound in said groove, and a loop portion of said band between adjacent helix windings thereof being extended over the other carrier, and transmission mechanism for simultaneous rotation and axial movement of said groove carrier in alternative sawing or reverse directions, the axes of said carriers being relatively slightly divergent in the direction toward which the toothed edge of said saw band projects to induce entry of said band into said groove with the untoothed edge thereof crowded toward the adjacent side of said groove, the side of said groove adjacent the untoothed edge of said band being sloped to facilitate entry of said band into said groove.

10. A band saw machine including spaced rotatable saw carriers having band receiving grooves, a laterally flexible saw band having a toothed edge and mounted for travel around said carriers and through a working zone therebetween, the axes of said carriers being relatively slightly divergent in the direction toward which the toothed edge of said saw band projects to induce entry of said band into said groove with the untoothed edge thereof crowded toward the adjacent side of said groove, the side of said groove adjacent the untoothed edge of said band being sloped to facilitate entry of said band into said groove.

BENJAMIN GROB.
THEODORE GROB.